United States Patent
Klingman et al.

(10) Patent No.: US 9,982,969 B2
(45) Date of Patent: May 29, 2018

(54) PATROL VEHICLE AND PERSONAL PROTECTION SYSTEM

(71) Applicants: Joe Klingman, Snohomish, WA (US); Sandra Alder, Everett, WA (US)

(72) Inventors: Joe Klingman, Snohomish, WA (US); Sandra Alder, Everett, WA (US)

(*) Notice: Subject to any disclaimer, the term of this patent is extended or adjusted under 35 U.S.C. 154(b) by 0 days. days.

(21) Appl. No.: 15/471,423

(22) Filed: Mar. 28, 2017

(65) Prior Publication Data
US 2018/0045490 A1 Feb. 15, 2018

Related U.S. Application Data

(60) Provisional application No. 62/373,639, filed on Aug. 11, 2016.

(51) Int. Cl.
| | |
|---|---|
| F41H 5/14 | (2006.01) |
| F41H 5/26 | (2006.01) |
| F41H 5/08 | (2006.01) |
| B60J 5/04 | (2006.01) |
| B60J 1/08 | (2006.01) |
| B60J 1/20 | (2006.01) |
| B60R 11/00 | (2006.01) |

(52) U.S. Cl.
CPC ............ *F41H 5/263* (2013.01); *F41H 5/08* (2013.01); *B60J 1/085* (2013.01); *B60J 1/2094* (2013.01); *B60J 5/0493* (2013.01); *B60R 2011/0021* (2013.01); *B60R 2011/0026* (2013.01); *B60R 2011/0043* (2013.01)

(58) Field of Classification Search
USPC .................. 89/36.07, 36.09; 296/146.1
See application file for complete search history.

(56) References Cited

U.S. PATENT DOCUMENTS

| | | |
|---|---|---|
| 1,475,652 A | 2/1930 | Watson |
| 2,937,700 A | 5/1960 | Gibbons |
| 3,749,147 A | 7/1973 | Hess et al. |
| 3,855,898 A | 12/1974 | McDonald |
| 3,923,339 A | 12/1975 | MacDonald |
| 5,271,311 A | 12/1993 | Madden, Jr. |
| 5,318,145 A | 6/1994 | Vollmer |
| 5,419,088 A | 5/1995 | Raymond et al. |

(Continued)

*Primary Examiner* — John W Eldred
(74) *Attorney, Agent, or Firm* — Dean A Craine; Marisa Whitaker

(57) ABSTRACT

A patrol vehicle protection system with a quick release bullet resistant transparent panel and door panel covering system that requires no permanent modifications to the patrol vehicle, offers head impact safety protection, and ventilation. The system includes a bullet resistant transparent panel that temporarily attaches to a door window opening mounting mechanism attached to the vehicle door. The mounting mechanism includes z-shaped upper and lower brackets designed to fit into the upper and lower slots formed around the window opening. An adjustment plate or brace holds the brackets in place in the slots. The transparent panel is securely held between the two brackets during normal use but automatically releases outward in a side impact collision. The system also includes a ballistic fabric panel that hangs from the lower bracket over the inside surface of the door panel to protect the driver's legs and lower torso of the driver sitting in the patrol vehicle.

20 Claims, 18 Drawing Sheets

(56) References Cited

U.S. PATENT DOCUMENTS

| | | | |
|---|---|---|---|
| 5,487,323 A | 1/1996 | Maden, Jr. | |
| 5,570,542 A | 11/1996 | Cameron | |
| 5,476,302 A | 12/1996 | Ronci | |
| 7,052,069 B2 | 5/2006 | Vance | |
| 7,152,906 B1 | 12/2006 | Farrar et al. | |
| 7,686,379 B2 | 3/2010 | Lemieux | |
| 7,841,269 B1 | 11/2010 | Jacobs | |
| 8,500,186 B2 | 8/2013 | Warren et al. | |
| 2015/0114533 A1* | 4/2015 | Peries | B60J 11/08 150/168 |
| 2015/0268009 A1* | 9/2015 | Tunis, III | B43L 1/00 89/36.02 |

\* cited by examiner

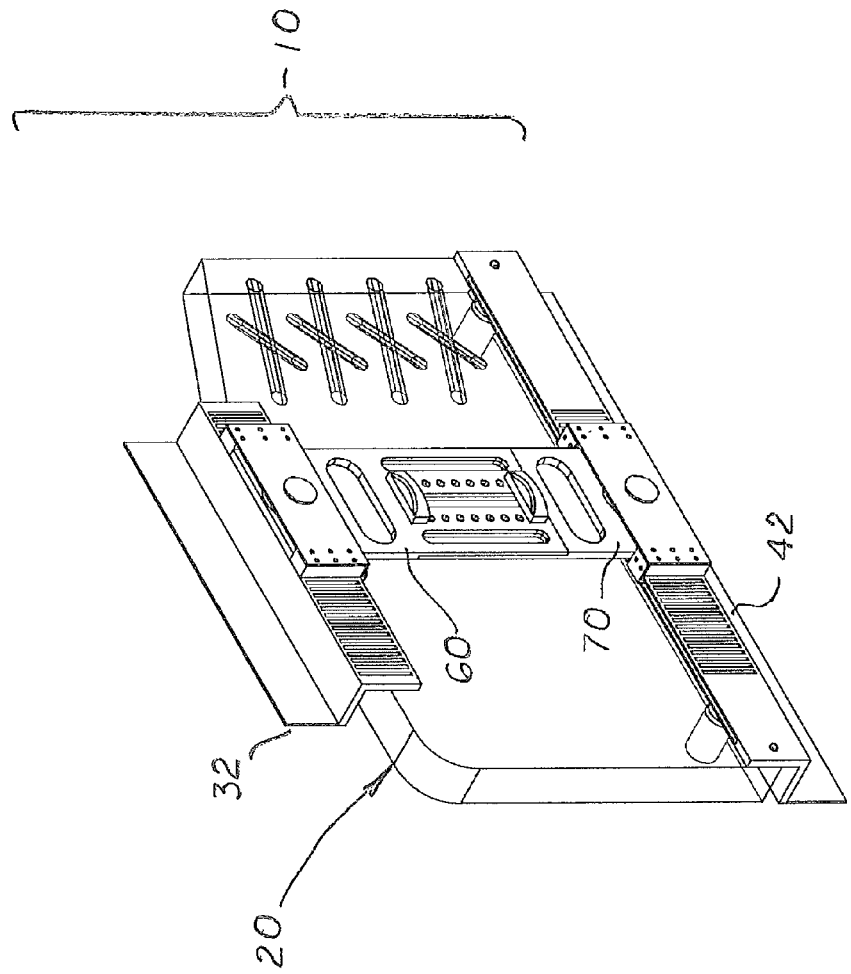

PATROL VEHICLE AND PERSONAL PROTECTION SYSTEM

This utility patent application is based on and claims the filing date benefit of U.S. provisional patent application (Application No. 62/373,639), filed on Aug. 11, 2016.

Notice is given that this patent document contains original material subject to copyright protection. The copyright owner has no objection to the facsimile or digital download reproduction of all or part of the patent document, but otherwise reserves all copyrights.

BACKGROUND OF THE INVENTION

1. Field of the Invention

This invention pertains to ballistic-resistant protection systems for police officers, and more particularly, to bullet-resistant protection systems for patrol vehicles that can be easily attached or removed from the patrol vehicle and includes a transparent panel that automatically releases from the vehicle's window opening in a side impact collision and can be selectively removed from the window opening and used as a personal, hand-carried protection shield.

2. Description of the Related Art

Patrol vehicles rarely have bullet-resistant windows and doors to protect the police officers from being shot while sitting in the patrol vehicle. Unfortunately, the cost to purchase and install bullet-resistant windows and doors in a patrol vehicle and then remove them from the patrol vehicle when the patrol vehicle is sold to the public is too expensive for some municipalities. Further, ballistic resistant window systems found in the prior art creates a safety risk for the occupants as one's head may impact the ballistic glass. Because bullet-resistant windows are thicker and have greater mass, head injuries are more serious in a side impact accident in patrol vehicles with such windows.

Sometimes, police officers assigned to a patrol vehicle must leave their patrol vehicles. Because they may be shot or struck with rocks or other objects when outside the patrol vehicle, easy access to a lightweight, portable, bullet-resistant, protection shield they may use when outside the patrol vehicle would be desirable.

What is needed is a bullet-resistant protection system for a patrol vehicle that protects the head, upper torso, arms and legs of a driver and a passenger sitting in the patrol vehicle that can be easily installed and removed from the patrol vehicle and also does not require expensive modification to the patrol vehicle. What is needed is a system that uses a transparent panel made of ballistic-rated material and fits into the patrol vehicle's door window opening that automatically releases outward from the window opening when the vehicle experiences a rapid lateral change in velocity, such as may occur in a side impact collision. What is also needed is a system in which the transparent panel that can be easily and quickly disconnected from the patrol vehicle and used as a hand-held protection shield.

SUMMARY OF THE INVENTION

At the heart of the invention is the discovery of the need for an inexpensive, easy to install and easy to remove bullet-resistant system for a patrol vehicle that protects the head, upper torso, arms of a driver or passenger sitting in the front seat of the patrol vehicle. Also at the heart of the invention is the discovery of the need for a ballistic-rated transparent panel that automatically releases outward from the window opening when the patrol vehicle experiences a rapid lateral change in velocity such as may occur in a side impact collision. Also, such a system is needed that allows the driver to adjust the system to provide additional protection to his or her lower torso and legs when sitting in the patrol vehicle. Also, such a system is needed that includes a quick release feature that allows the driver to remove the transparent panel from the window opening and use it as a hand-held protection shield.

The system includes a ballistic-rated transparent panel that temporarily attaches to the patrol vehicle's existing door window opening using an easy to attach, adjustable door window opening mounting mechanism. During installation, the existing door window is lowered into the door and the system's window opening mounting mechanism is installed on the door frame located around the upper and lower edges around the window opening. The mounting mechanism is configured to securely hold the transparent panel and also fit into the window opening and still allow the existing door window to be opened or closed.

The mounting mechanism includes an upper bracket, a lower bracket and a vertical brace that extends between the upper and lower brackets. The upper and lower brackets are Z-shaped in cross-section with flange surfaces designed to fit into the existing window slots formed on the upper and lower edges of the door frame around the window opening. The mechanism includes a brace is configured to lock onto the upper and lower brackets and holds them securely in the slots. The brace is relatively long and narrow and may be made of transparent, durable polycarbonate, glass, or acrylic material (or a combination thereof). The brace may include openings that reduce weight and/or further improve visibility.

A plurality of connecting elements are disposed between the transparent panel and the upper and lower brackets that temporarily hold the transparent panel in place against the intermediate flanges formed on the upper and lower brackets. In one embodiment, the connecting elements are magnets attached to the edges of the transparent panel. The magnets on the transparent panel are magnetically attracted to the brackets when made of metallic ferrous material or include plates made of ferrous material. It should be understood that the magnets may be attached to the brackets and ferrous plates or strips are attached to the edges of the transparent panel. In all the magnet based embodiments, the magnets generate enough attractive force to allow the transparent panel to release outward when for example, the vehicle is accelerated laterally over 3 mph in under 200 milliseconds or similar such forces experienced in a side impact collision.

In other embodiments, the connecting elements may be L-shaped breakable clips, loop and hoop connectors, or rotating break-away tabs attached to the brackets that hold the transparent panel in place on the brackets and allow release in a side impact collision.

By using a plurality of connecting elements between the transparent panel and the upper and lower brackets during a side impact collision, the transparent panel automatically detaches and moves outward reducing head injuries.

The transparent panel may include an optional, handle mounted on the transparent panel's outside surface. In one embodiment, the handle is selectively attached to the transparent panel by the police officer. By pulling on the handle, a police officer can easily remove the transparent patent from the mounting mechanism and use the transparent panel as a handheld protective shield.

In addition, the system includes a carrying case used to store and transport the transparent panel. The case is made of two complimentary-shaped leaves. The case may include a ballistic fabric panel which acts as a ballistic barrier when the case is hung over the inside surface of the vehicle door. The case may include connectors that attach to the lower bracket on the mounting mechanism. The ballistic fabric panel has a suitable shape and size so when hung vertically over the inside surface of the door, the driver's or passenger's lower torso and legs are protected when sitting in the patrol vehicle.

DESCRIPTION OF THE DRAWINGS

FIG. 3 is a front perspective view of one embodiment of the door window opening covering system.

DESCRIPTION OF THE PREFERRED EMBODIMENT(S)

Figure 1:
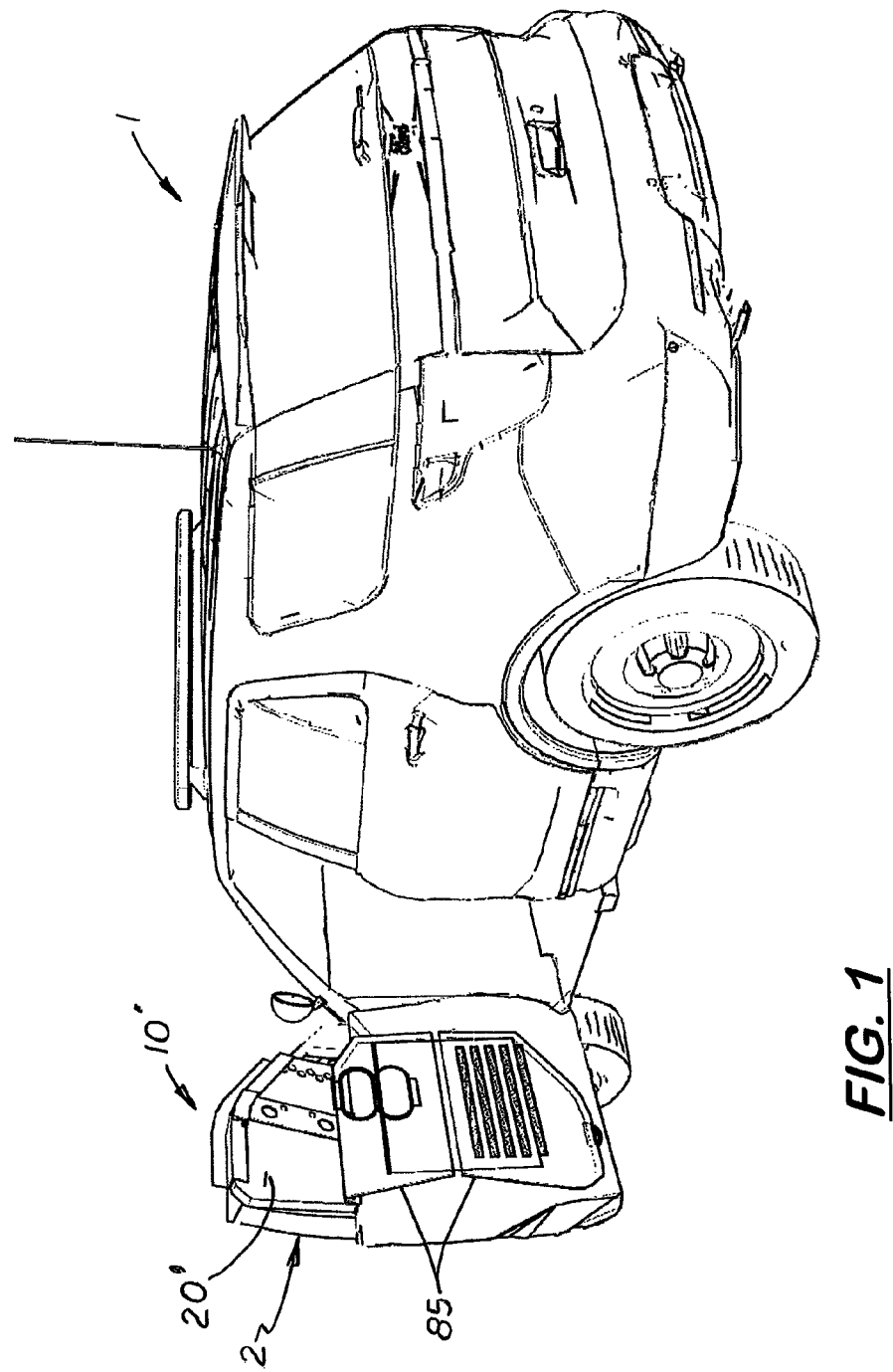
FIG. 1 is a rear perspective view of the patrol vehicle system attached to a patrol vehicle door.

A patrol vehicle protection system 10 is provided with a quick release ballistic-rated transparent panel 20 and door panel covering system that requires no permanent modifications to the patrol vehicle, offers head impact safety protection, and ventilation. The system 10 includes a ballistic-rated transparent panel 20 that temporarily extends entirely or partially attaches over an existing door window opening 5 using an easy to attach door window opening mounting mechanism 25. In one embodiment, the system 10 is described being installed on one vehicle door 2. It should be understood, however, that the system 10 may be used on two or more vehicle doors. It should be understood the system 10 may be installed on either front doors or rear doors on a motor vehicle.

The ballistic-resistant transparent panel 20 is made of polycarbonate, glass, acrylic, or newer materials such as those made by scientists at Surmet, a company that develops a transparent polycrystalline called ALON Optical Ceramic (commonly called 'Transparent Aluminum', or aluminum nitride or a combination thereof, and configured to fit into the vehicle door window opening 5. The transparent panel 20 has enough length and width to fit inside the door window opening 5. When made of polycarbonate, glass or acrylic, the transparent panel 20 is between approximately ½ to 4½ inches thick depending on the needed level of protection. When the transparent panel 20 is made of ALON it may be made ¼ to 2 inches thick. Transparent panels 20 made of polycarbonate ballistic-related materials are available from Bayer Science of Leverkusen, Fed. Rep. Germany and sold under the trademark MAKROLON or from Covestro, LLC, of Pittsburgh, Pa. and sold under the trademark HYGARD.

The transparent panel 20 is held to the upper and lower brackets by connecting elements. In one embodiment, the connecting elements include a plurality of magnets 22, 24. In the embodiment shown in the Figs. the transparent panel 20 includes at least one inward facing upper magnet 22 and two inward facing lower magnets 24 evenly spaced apart and configured to be magnetically attracted to complimentary-shaped magnets 120, 122 attached to the inside surface of the upper and lower brackets 32, 42, respectively, used as a door window opening mounting system 25. The magnetic poles on the magnets 22, 122 and 24, 124 are arranged so they attract when in close proximity.

The door window open mounting mechanism 25 includes an upper Z-shaped bracket 32, a lower Z-shaped bracket 42, and a vertical brace 58. The brackets 32, 42 are made of steel. In the first embodiment, the brace 58 comprises two longitudinally aligned metal plates 60, 70 each attached at one end to an upper and lower bracket 32, 42, respectively. The opposite ends of the two plates 60, 70 overlap and are selectively attached and extended vertically over the inside area in the door window opening 5. By adjusting the overlap areas on the adjustable plates 60, 70, the overall length of the brace 58 may be adjusted to fit different size window openings 5. In the 2nd embodiment, the brace 258 is made of polycarbonate or plastic and is of a fixed length.

The upper bracket 32 is Z-shaped in cross-section with an inner flange surface 34, an intermediate flange surface 36 and an outer flange surface 38. The outer flange surface 38 is configured to be inserted into the window upper edge track 6 formed on the upper door frame surrounding the existing door window opening 5. Formed on the inside surface of the inner flange surface 34 are a plurality of parallel slots 35 configured to receive ribs 62, 72 formed on an upper clamp 120 discussed further below.

The lower bracket 42 is also Z-shaped in cross-section and includes an inner flange surface 34, an intermediate flange surface 36 and an outer flange surface 38. The outer flange surface 38 extends downward on the lower bracket 42 and configured to be inserted into the window lower edge track 8 formed on the lower inside edge of the existing door window opening 5. Formed on the inside surface of the inside flange surface 34 are a plurality of parallel slots 49 configured to receive rib 62, 72 formed on a lower clamp 130 also discussed further below.

Figure 10:
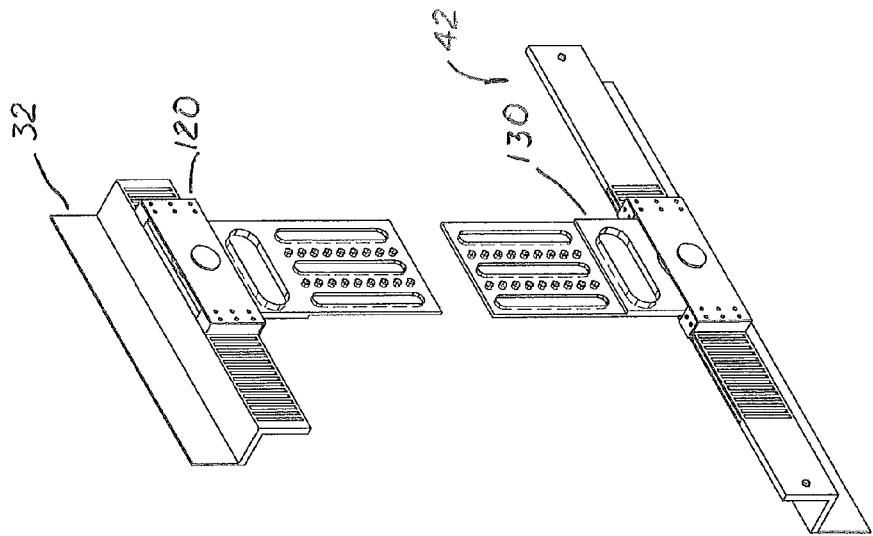
FIG. 10 is a partially exploded view of the upper and lower brackets both attached to a half adjustment plate and showing the upper and lower clamps attached from the two brackets.
Figure 9:
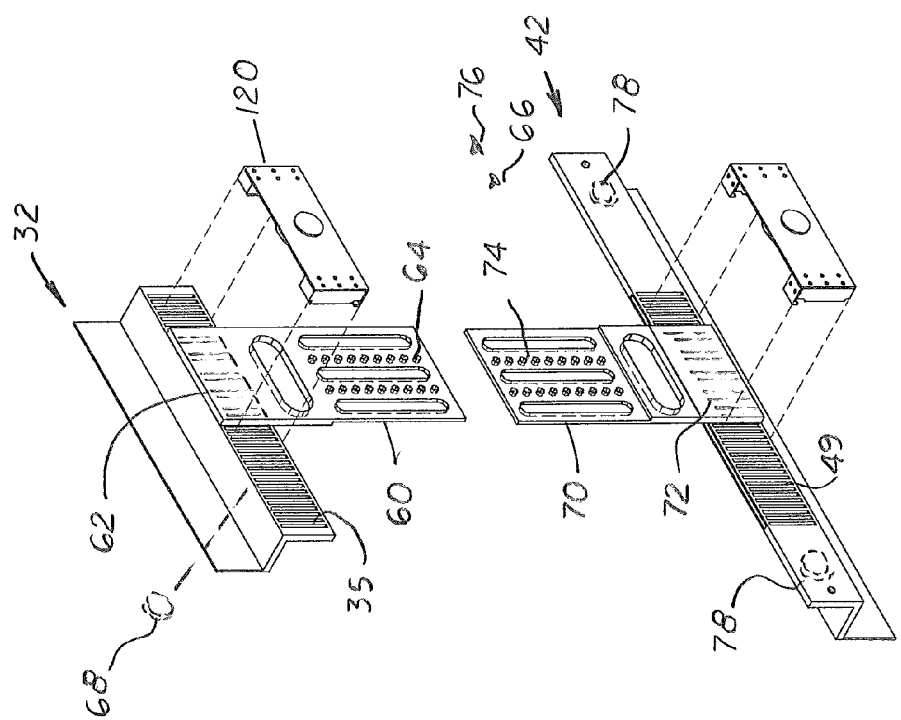
FIG. 9 is an exploded view of the upper and lower brackets both attached to a half adjustment plate and showing upper and lower clamps detached from the brackets.

As shown in FIGS. 9 and 10, the two adjustable plates 60, 70 each include a flat upper and lower surface, a handle hole, and three parallel rows of longitudinally aligned mounting holes 64, 74. Formed on the outside surface of each plate 60, 70 is a plurality of longitudinally aligned ribs 62, 72, respectively configured to engage slots 35, 49 formed on the upper and lower brackets 32, 42, respectively. During assembly, the plates 60, 70 are perpendicularly aligned on the upper and lower brackets 32, 42 so the ribs 62, 72 formed on the plates 60, 70 are engaged in slots 35, 49. The plates 60, 70 are longitudinally aligned so their lower and upper ends overlap and the mounting holes 64, 74, respectively, are aligned and registered. Pegs 66, 76 are then inserted in the mounting holes 64, 74 to connect the ends of the two plates 60, 70 together.

When the brackets 32, 42 are made of steel, the magnets 22, 24 on the transparent panel 20 may be directly connected to the brackets 32, 42. When the brackets 32, 42 are made of non-metallic material, the brackets 32, 42 include magnetically attracted discs 68, 78 magnetically attracted to the magnets 22, 24, respectively, on the inside surface of the transparent panel 20.

Figure 11:
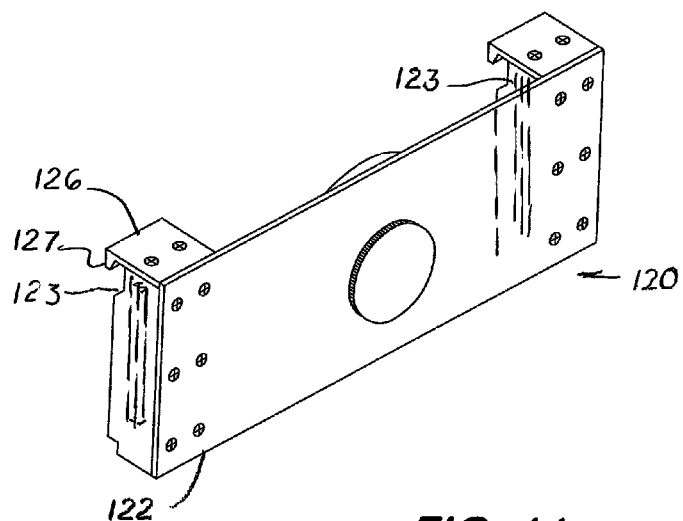
FIG. 11 is a perspective view of the upper clamp.

FIGS. 10 and 11 are perspective views of the upper and lower clamps 120, 130 used to hold the brace 58 on the upper and lower brackets 32, 42. Each clamp 120, 130 includes a rectangular plate 122, 132, and two spacer blocks 124, 134 aligned transversely on the ends of the rectangular plate 122, 132, respectively. Attached to the upper surfaces on the two spacer blocks 124, 134 on the upper clamp 120 are two end caps 126 each with a downward extending lip 137 formed on its distal end. Attached to the lower surfaces on the two spacer blocks 124, 134 on the lower clamp 130 are two end caps 136 each with an upward extending lip formed on its distal end. Attached to the inside surface of spacer blocks 124, 134 are longitudinally aligned ribs 123, 133 configured to engage slots 35, 49 formed on the inside surfaces of the inside flanges 34, 44 on the upper and lower brackets 32, 42. During assembly, ribs 123, 133 on the spacer blocks 124, 134 are engaged into slots formed on the upper and lower brackets 32, 42 to hold the clamps 120, 130 in position on the upper and lower brackets 32, 42.

In one embodiment, the upper and lower brackets 32, 42 may be made of metal magnetically attracted to bar magnets attached to the spacer blocks 124, 134 to hold the clamps 120, 130 on the brackets 32, 42, respectively.

Figure 12:
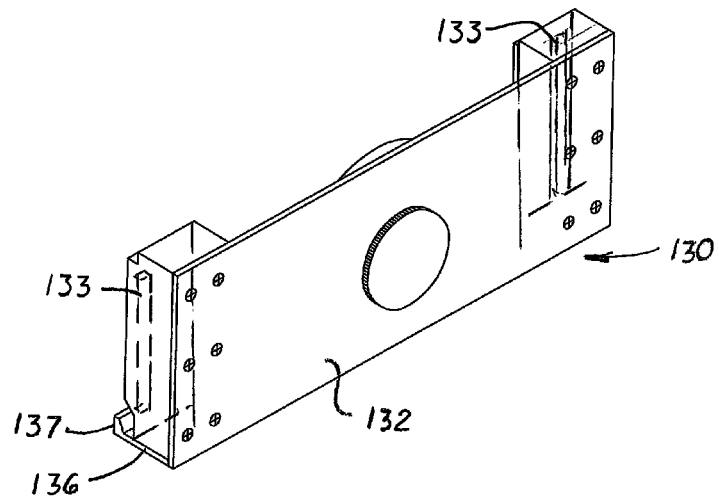
FIG. 12 is a perspective view of the lower clamp.

FIG. 12 is a perspective view of the lower clamp 130 with an optional adjustable pad 140 configured to press against the brace 58 hold the brace 58 and in a fixed position on the upper and lower brackets 32, 42.

Figure 8:
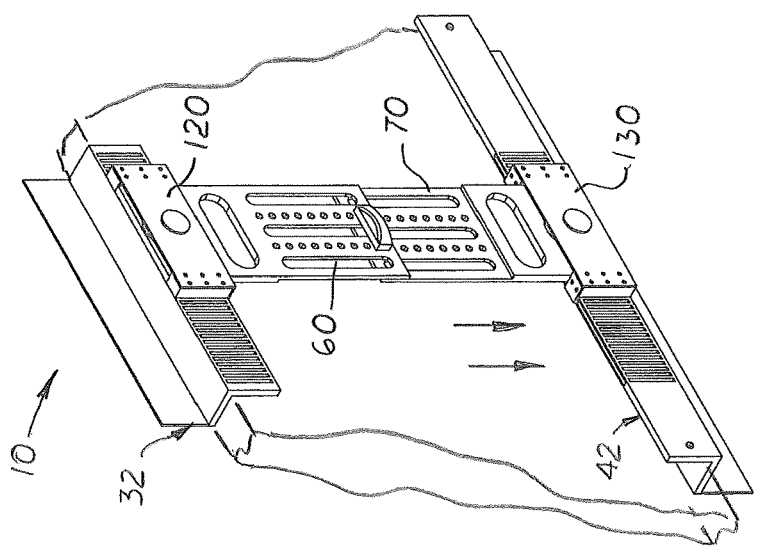
FIGS. 6-8 are rear perspective views of the upper and lower brackets attached to a center adjustment plate expanded longitudinally to three lengths to accommodate different size window openings.
Figure 7:
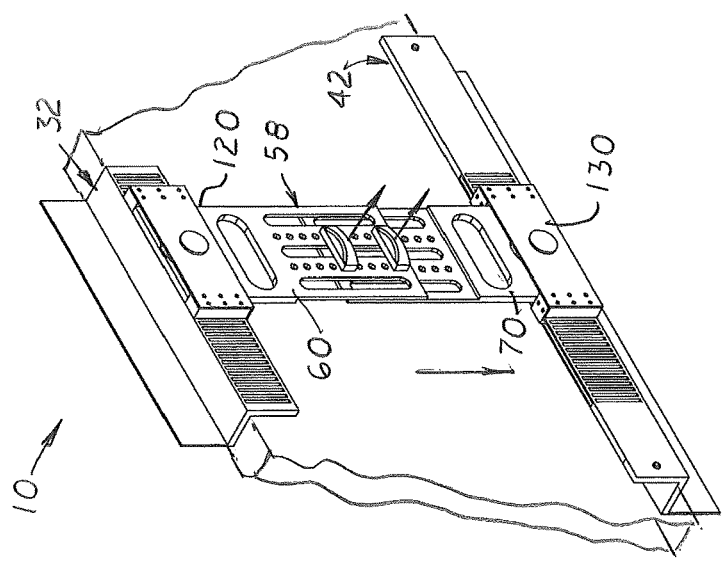
Figure 6:
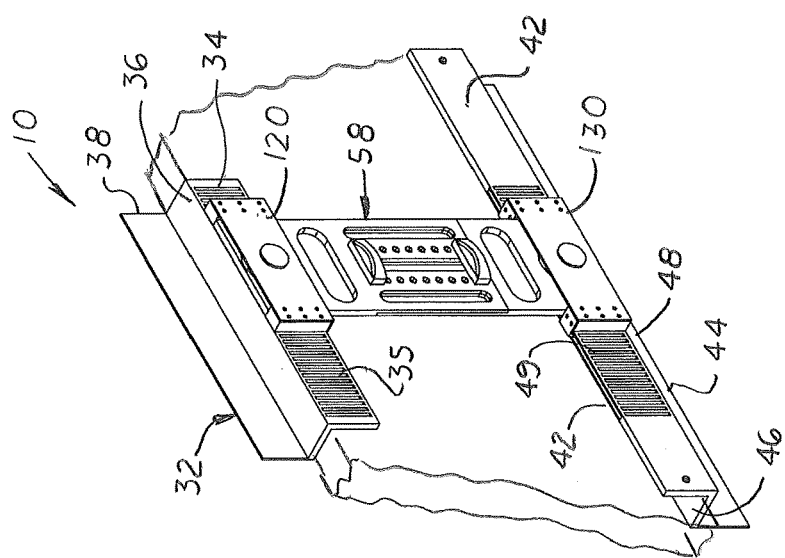
Figure 13:
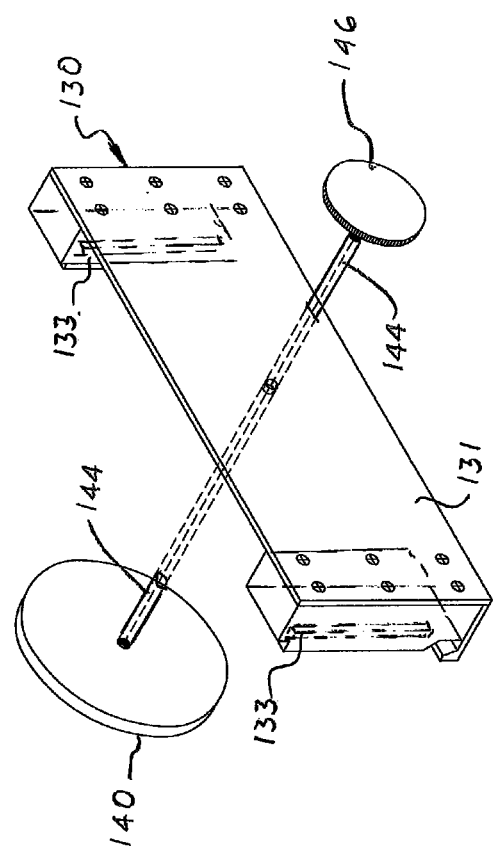
FIG. 13 is a perspective view of the lower clamp with an optional adjustable pad configured to press against the half adjustment plate.
Figure 15:
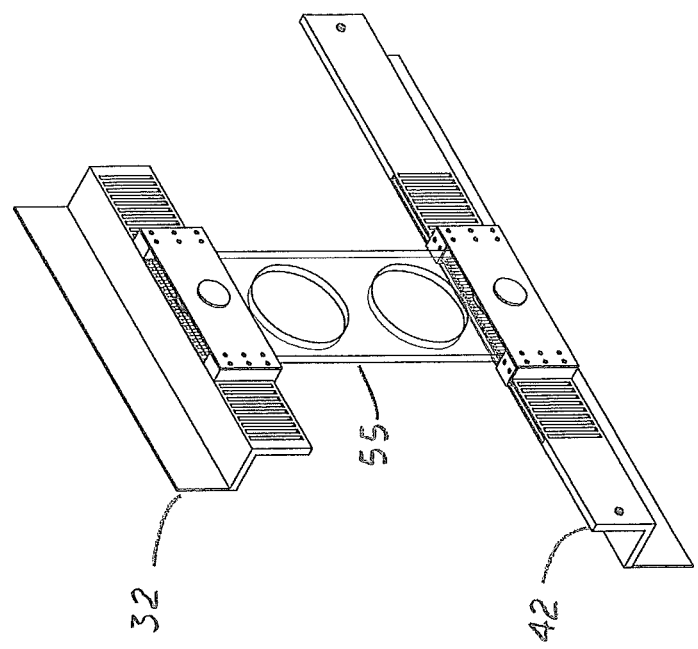
FIGS. 14 and 15 are perspective views of the upper and lower brackets both attached to a fixed adjustment plate with an upper clamp and a lower clamp.
Figure 14:
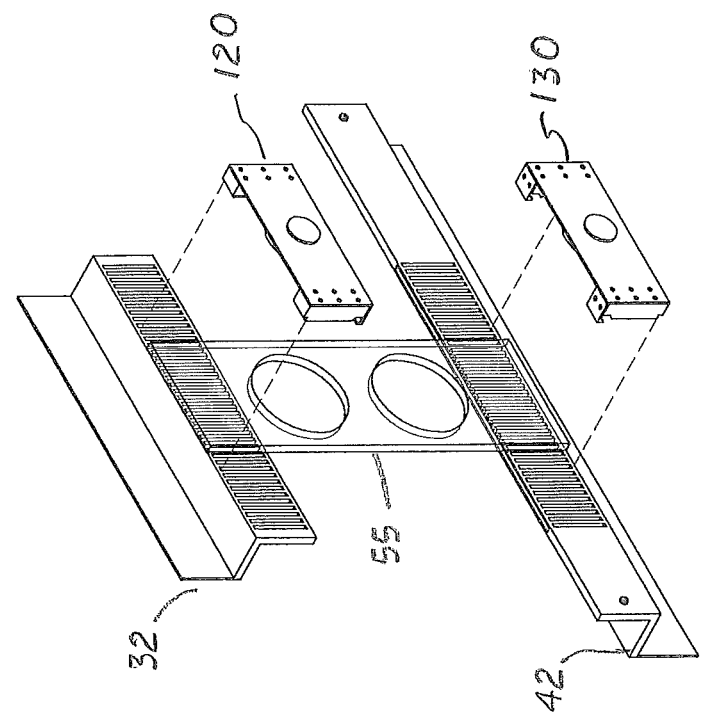

In the first embodiment, the brace 58 is made of two, transparent, polycarbonate adjustment plates 60, 70 as shown in FIGS. 8 and 9. The brace 58 may be a single, fixed adjustment plate preferably made of transparent, polycarbonate material. FIGS. 13 and 14 are perspective views of the upper and lower brackets 32, 42 both attached to a fixed adjustment brace 58.

Figure 2:
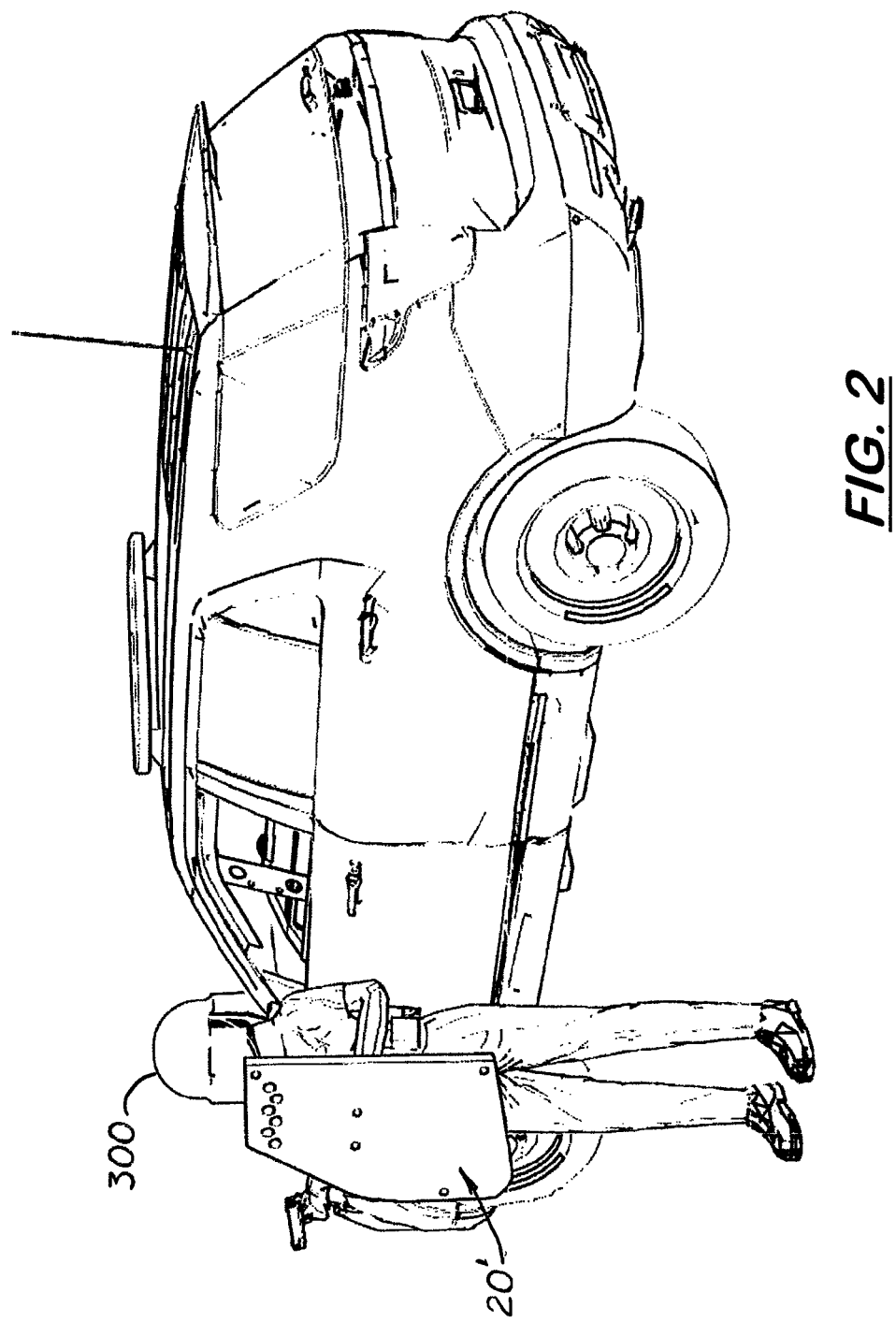
FIG. 2 illustrates a police officer using the system's transparent panel as a shield.
Figure 5:
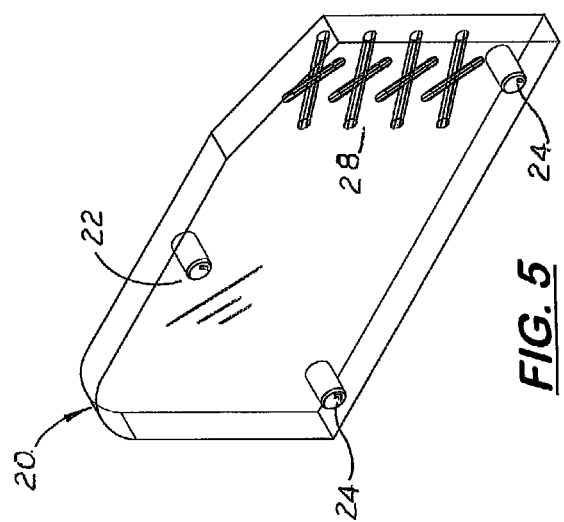
FIG. 5 is a front perspective view of the transparent panel.

During installation, the brace 58 is attached to the brackets 32, 42 and adjusted in length so the brackets 32, 42 are positioned at a desirable location in the door window opening 5. When properly installed, the magnets 22, 24 on the transparent panel 20 are aligned with the brackets 32, 42, or with the magnets 68, 78 on the upper and lower brackets 32, 42. The magnets 22, 24 will hold the transparent panel 20 on the upper and lower brackets 32, 42 but also allows release of the transparent panel 20 from the brackets 32, 42 when the vehicle experiences a rapid lateral change in velocity or pulled manually the transparent panel 20 from the brackets 32, 42 when used as a personal shield as shown in FIG. 2.

Figure 16:
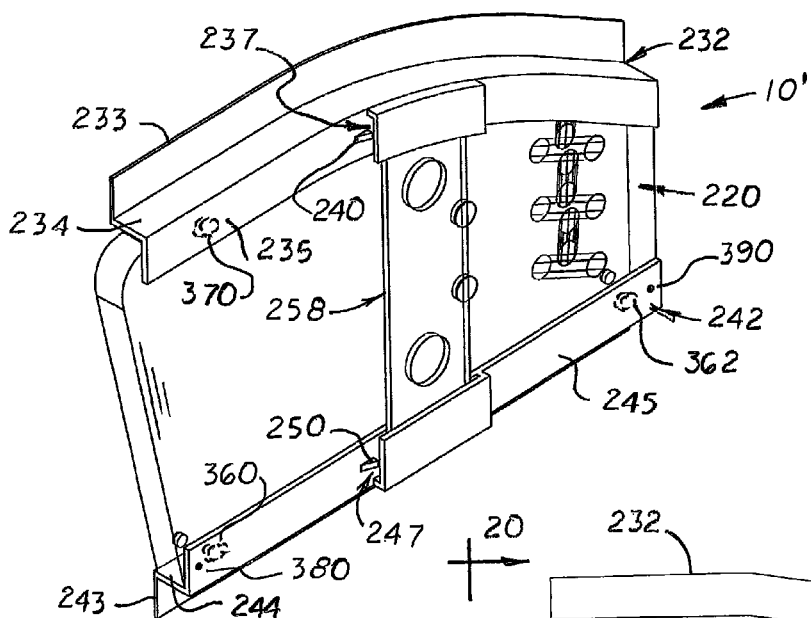
FIG. 16 is a perspective view of a second embodiment of the patrol vehicle protection system that uses a fixed length brace.
Figure 17:
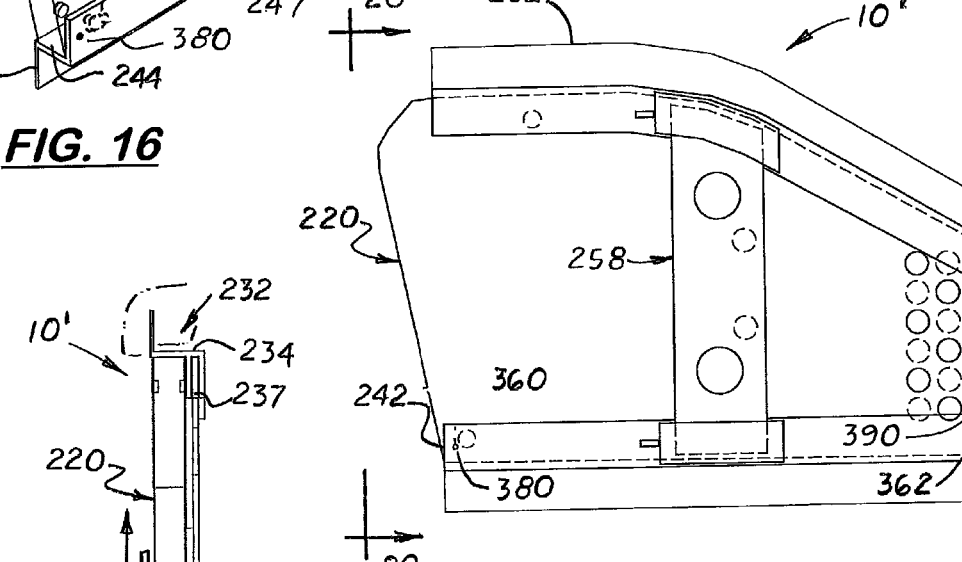
FIG. 17 is a side elevation view of a third embodiment of the system shown in FIG. 16.
Figure 18:
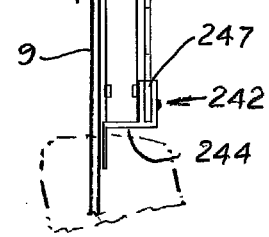
FIG. 18 is an end elevation view of the embodiment shown in FIGS. 16 and 17.

FIGS. 16-18 show a second embodiment of the system 10' that includes a curved, Z-shaped upper bracket 232, a straight, Z-shaped lower bracket 242 and a brace 258. The upper bracket 232 includes an upper outer flange surface 233, an intermediate flange surface 234 and a lower, inner flange surface 235. Mounted on the inner flange surface 235 near the upper bracket's center axis is a receiver slot 237. The lower bracket 242 includes a lower outer flange surface 243, an intermediate flange surface 244 and an upper inner flange surface 245. Mounted on the inner flange surface 245 near the lower bracket's center axis is a receiver slot 247. The receiver slots 237, 247 are sufficiently wide, substantially parallel, and have a length to accommodate the ends of the transversely aligned brace 258. The forward ends of the receiver slots 237, 247 are closed. Formed or attached to the inside surface of the inner flange surface 235 and on the inner flange surface 235 are diagonal stop lips 240, 250, respectfully, that prevent the brace 258 from sliding rearward from the receiver slots 237, 247.

Formed on the outside surface on the inner flange surface 245 on the lower bracket 242 near its opposite ends are two magnets 360, 362. Formed on the outside surface of the lower flange surface 235 on the upper bracket 232 near the rear end of the upper bracket 232 is a single magnet 370. Also formed on the lower bracket 242 near the opposite ends are snap or hook or loop connectors 380, 390.

As shown in FIG. 18, the width of each intermediate flange surface 234 or 244 is enough so a transparent panel 20' may be fit over the intermediate flange surfaces 234, 244. When attached to the mounting mechanism, the window glass 9 may still be selectively lowered or raised.

Figure 19:
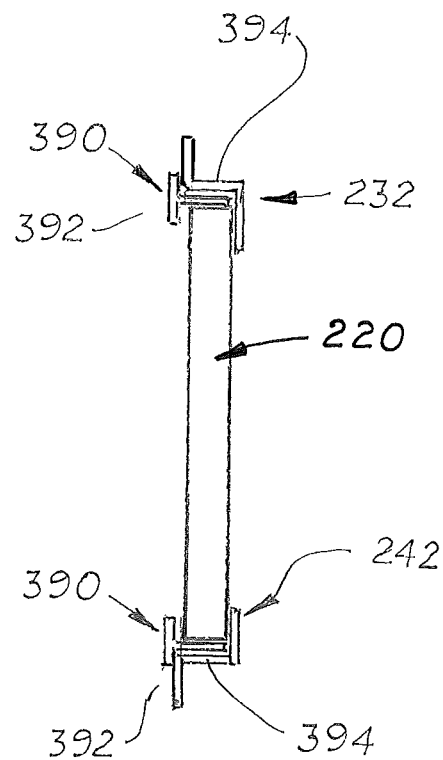
FIG. 19 is an end elevational view of the upper and lower brackets surrounding a transparent panel with T-shaped clips being inserted into a slot formed on the lower bracket that holds the edge of the transparent panel in place on the lower bracket.
Figure 20:
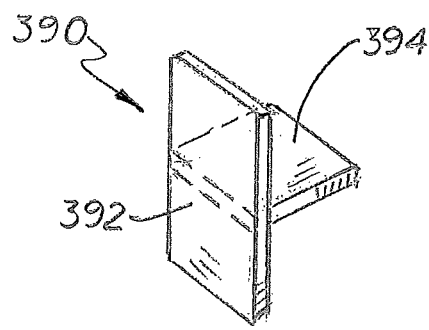
FIG. 20 is a perspective view of a T-shaped clip shown in FIG. 19.

The magnets hold the transparent panel 20 in place on the brackets in normal driving conditions. In a side impact collision, the transparent panel 220 detaches from the brackets. Besides using magnets, FIGS. 19 and 20 show T-shaped clips 390 mounted in-between the intermediate flanges on the upper bracket 232 and lower bracket 242 and the top and lower edges of the transparent panel 220. Each clip 390 includes an outer leg 392 and a perpendicularly aligned intermediate leg 394. During use, the intermediate leg 394 is inserted into the gap formed between the brackets 232, 242 and the top and bottom edges of the transparent panel 220. The clips 390 are configured to exert enough pressure to hold the transparent panel 220 in place but allow the transparent panel 220 to detach in a side impact collision or if manually pulled outward by the patrol officer to use the transparent panel 220 as a protective shield.

Figure 21:
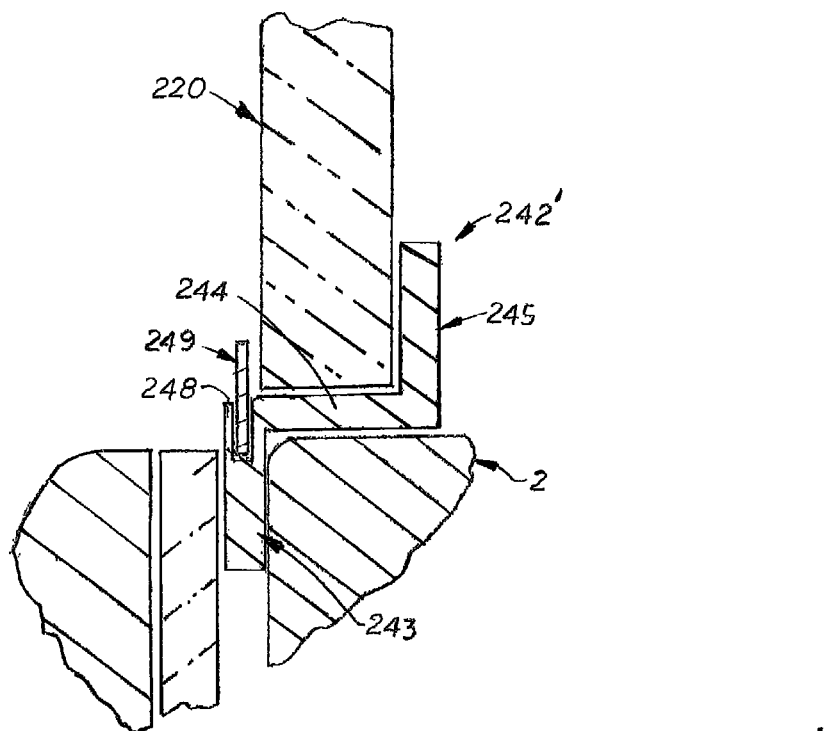
FIG. 21 is a upper, sectional view of a door showing a modified z-shaped lower bracket with a longitudinally aligned slot formed on the intermediate flange parallel with the inside flange and that receives a straight tab configured to break apart when the transparent panel moves outward during a side impact collision.

FIG. 21 is a upper, sectional view of a door showing a modified z-shaped lower bracket 242' used with a transparent panel 220 with a longitudinally aligned slot 248 formed on the intermediate flange 244 and is parallel to the inside flange 245. During use, the slot 248 receives a straight break-away tab 249 configured to break apart when the transparent panel 220 moves outward during a side impact collision or manually pulled by the police officer.

Figure 22:
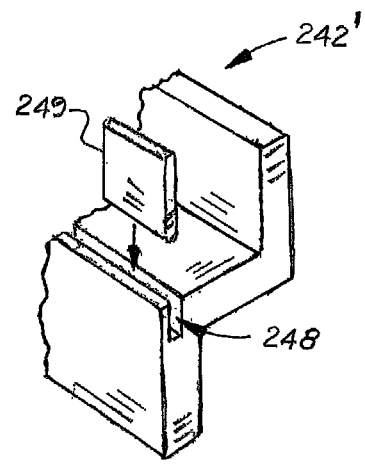
FIG. 22 is a perspective of the lower bracket and tab shown in FIG. 21.

FIG. 22 is a perspective of the lower bracket 242' and tab 249 shown in FIG. 21. It should be understood that when upper bracket 242 can be modified in the same manner as 242' and used with a tab 249.

Figure 23:
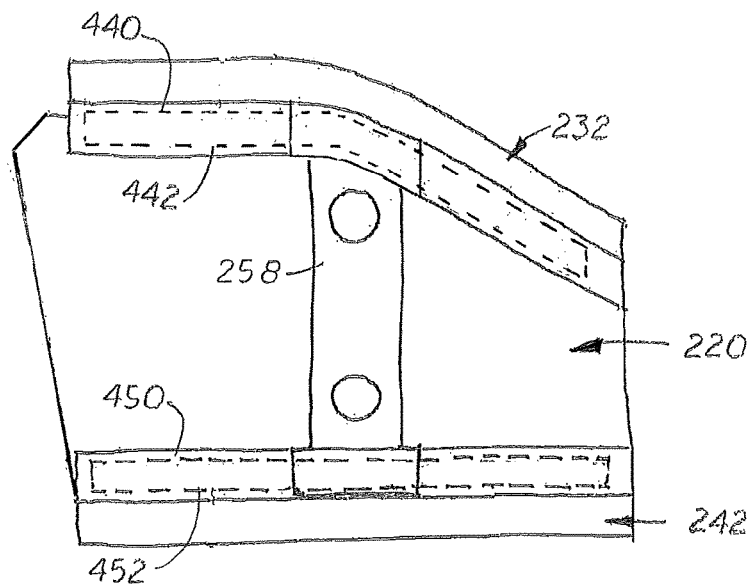
FIG. 23 is a side elevational view an upper bracket, a lower bracket, a brace and a transparent panel mounted on the upper and lower bracket shown in FIG. 16 but with strips of hook and loop connector material attached to the inside surface of the upper and lower flanges on the upper and lower brackets, respectively.

FIG. 23 is a side elevational view an upper bracket 232, a lower bracket 242, a brace 258 and a transparent panel 220 mounted on the upper and lower brackets 232, 242 by strips of hook and loop connector material, 440, 442 and 450, 452, attached to the inside surface of the upper and lower flanges on the upper bracket 232 and lower bracket 242, respectively.

Figure 24:
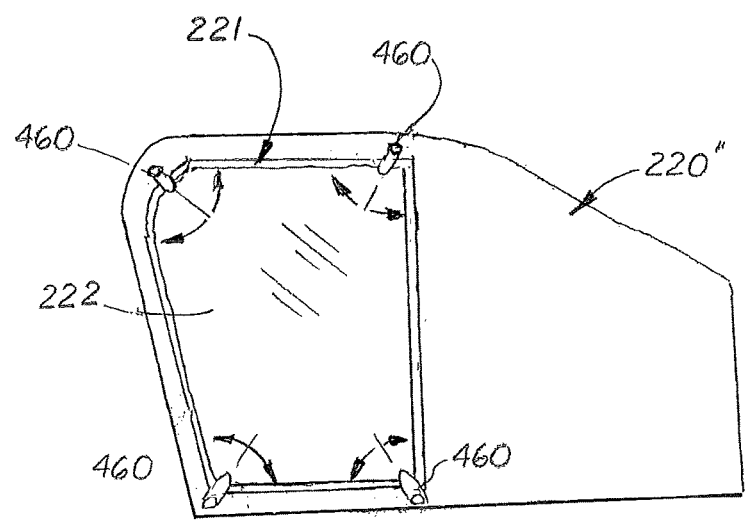
FIG. 24 is a side elevational view of a modified transparent panel with a small window opening formed therein that receives a small transparent panel held inside the window opening by four rotating clips.

FIG. 24 is a side elevational view of a modified transparent panel 220 with a small window opening 221 formed therein that receives a small transparent panel 221 held inside the window opening 221 by four rotating clips 460.

Figure 4:
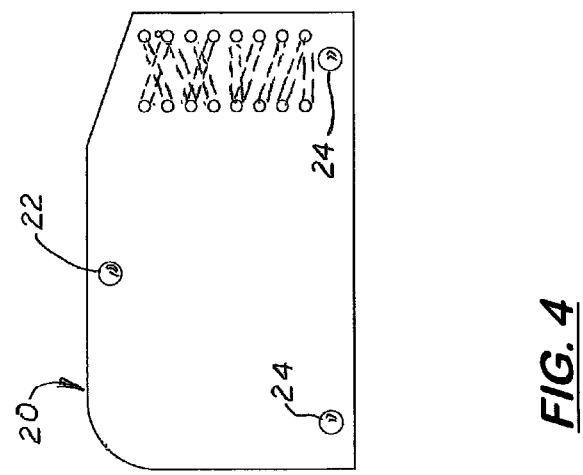
FIG. 4 is a side elevational view of the transparent panel.
Figure 25:
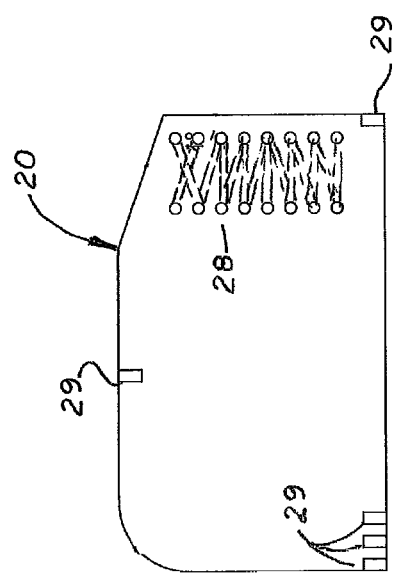
FIGS. 25 and 26 are a side elevational view and a front perspective view, respectively, of an alternative transparent panel that uses five magnetic clips in place of three magnets shown in FIGS. 4 and 5.
Figure 26:
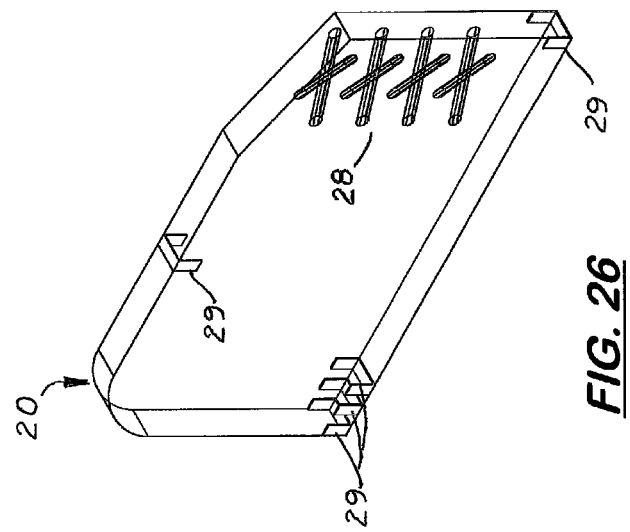

FIGS. 25 and 26 is a side elevational view and front perspective view, respectively, showing an alternative transparent panel 20' that uses five magnetic clips 29 used in place of two magnets 22 and 24 used in the transparent panel 20 shown in FIGS. 3 and 4.

Figure 27:
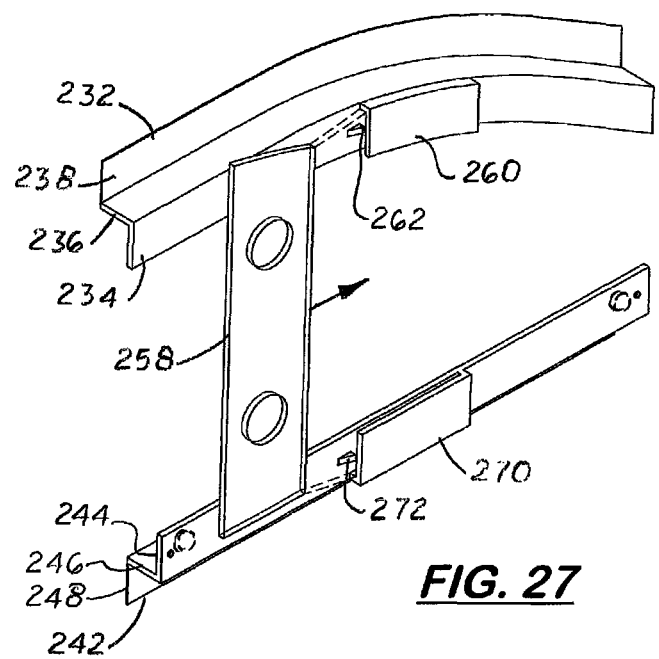
FIG. 27 is a perspective view of the upper and lower brackets that includes stops and slotted holder formed on the inside surface of the upper and lower brackets that captures the ends of the brace.

FIG. 27 is a perspective view of the embodiment of the mounting system that shows a brace 258 sliding over stops 262, 272 and into slotted receivers 260, 270 formed on the upper bracket 232 and lower bracket 242, respectively.

Figure 28:
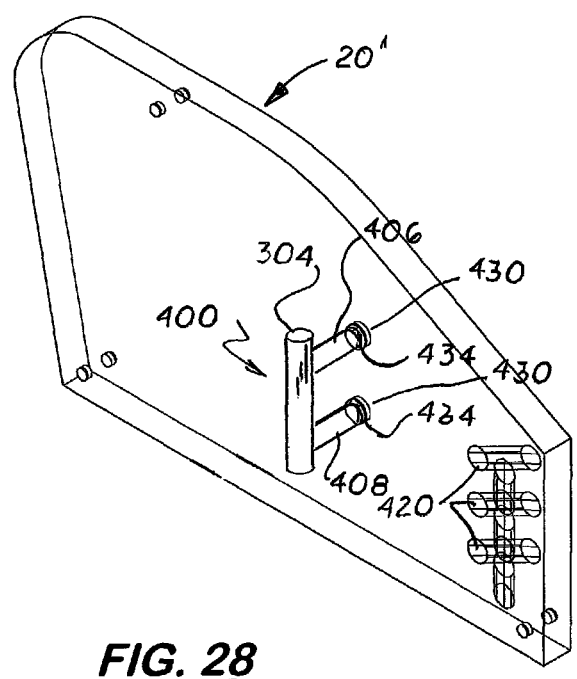
FIG. 28 is a perspective view of the transparent panel used in the embodiment shown in FIG. 24 with a removable, external handle attached to the transparent panel.

FIG. 28 is a perspective view of the transparent panel 20' used in the embodiment shown in FIG. 25 with an optional external handle 400 selectively or permanently attached to the transparent panel 20'. Transparent panel 20' may include ventilation holes 420 and handle holes 430. In one embodiment, the handle holes 430 are closed with magnets 434 located therein that connect to the legs 406, 408 on a handle 400.

Figure 29:
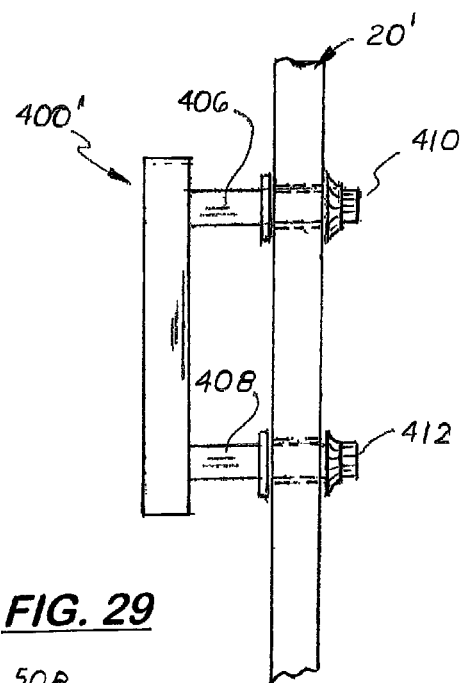
FIG. 29 is a side elevational view of the transparent panel with a fixed handle.

FIG. 29 is a side elevational view of the transparent panel 20' with a non-removable handle 400' with long legs 406, 408 that extend through the transparent panel 20' and held in place with end connectors 410, 412.

Figure 30:
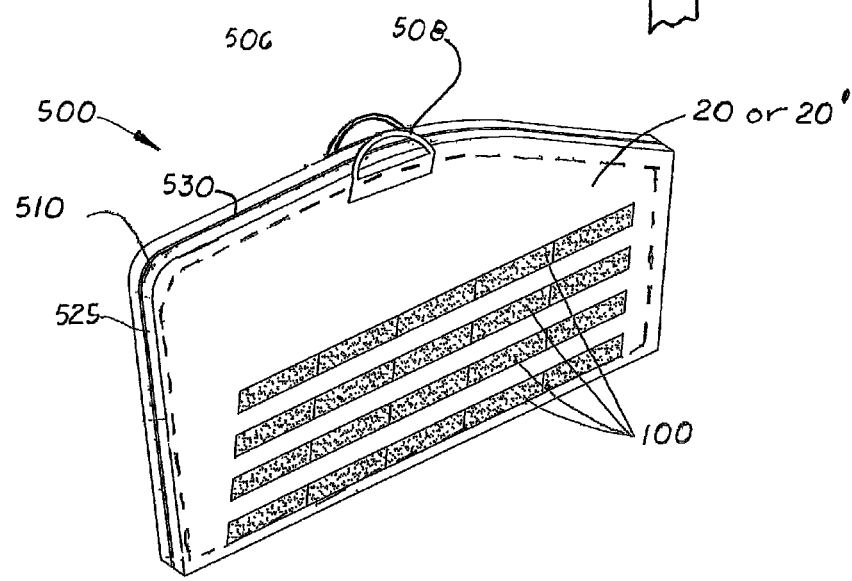
FIG. 30 is a perspective view of a carrying case with a transparent panel located inside the carrying case.

FIG. 30 is a perspective view of a carrying case 500 with a transparent panel 20 or 20' located inside the carrying case 500. The carrying case 500 includes one or two handles 506, 508, two leaves 510, 525 connected together by a slide connector 530. The carrying case 500 is enough in size and shape to hold the transparent panel 20 or 20'.

The system 10 also includes a ballistic fabric panel 600 configured to hang vertically over the inside surface of the door 4. The ballistic fabric panel 600 has a suitable shape and size so when hung along the inside surface of the door 4, the legs and lower torso of the driver or passenger are protected when sitting in the patrol vehicle 1. As shown in FIG. 29, the ballistic fabric panel 600 is stored inside a pocket 550 formed on a carrying case 500 that hangs vertically over the inside surface of the door 54. The carrying case 500 includes connectors or eyelets 502, 504 that attaches to connectors 380, 390 on the lower bracket 42 used on the door window mounting system 10 as shown in FIG. 24.

Figure 31:
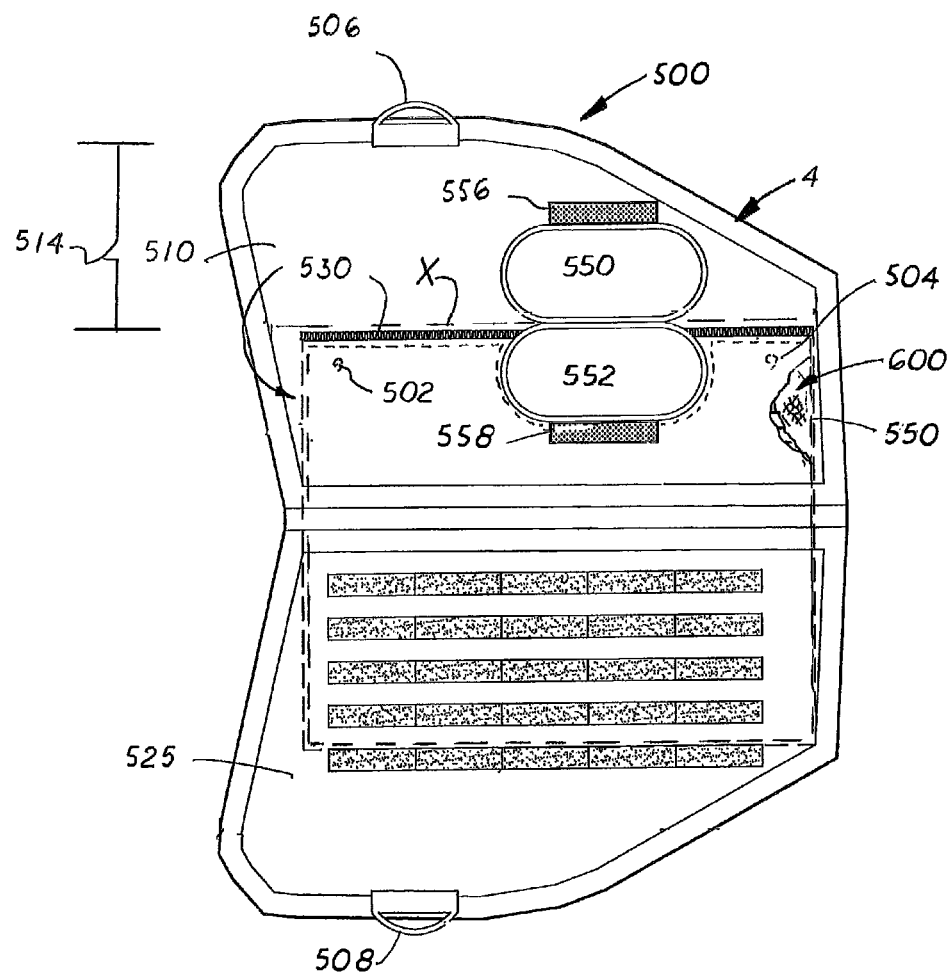
FIG. 31 is a side elevational view of the carrying case in an open configuration with a ballistic fabric panel disposed inside a pocket formed in the carrying case.
Figure 32:
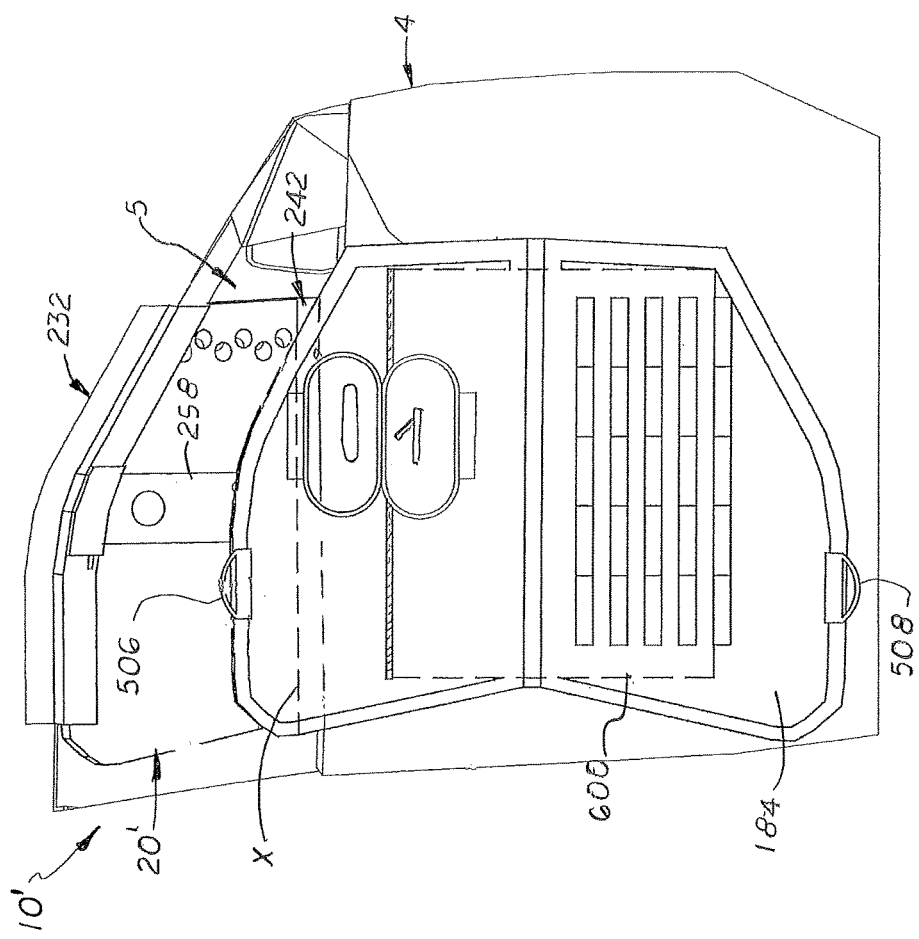
FIG. 32 is a side elevational view of a front door of a patrol vehicle showing the transparent panel, the mounting mechanism and a carrying case attached to the patrol vehicle.

FIG. 31 is a side elevational view of the carrying case 500 in an open configuration with a ballistic fabric panel 600 disposed inside a pocket 550 formed in the carrying case 500. Formed on the carrying case 500, is a handle opening 551, and handle opening cover flap 552. During use, the handle opening 551, is exposed as flap 552 falls against the interior of the door. The flap 552 allows access thru 551 for the driver to grasp the door handle or window up/down switch. Above and below the upper and lower handle opening 551, and the flap 552 are hook and loop connector strips 556, 558, respectively. When attaching the carrying case 500 to the door 4, the upper section 514 of the upper leaf 510 is folded inward along a fold line 'X' shown in FIG. 31. The connectors 502, 504 are then attached to the connectors 380, 390, respectively, to hold the carrying case 500 over the inside surface of the door 4. FIG. 32 is a side elevational view of a front door of a patrol vehicle showing the transparent panel 20', the mounting mechanism and a carrying case 500 attached to the door 4 on a patrol vehicle.

The ballistic fabric panel 600 is made of synthetic fiber sold under the trademark Kelvar (E.I. du Pont de Nemours and Company) and may be obtained from ArmorCo located at Ashtabula, Ohio.

The magnets that hold the transparent panel 20, 20' onto the brackets release the transparent panel 20, 20' from the brackets when the vehicle experiences a rapid lateral change in velocity. For example, any force that accelerates the patrol vehicle laterally more than over 3 mph in under 200 milliseconds.

The transparent panel 20, 20' when installed on the mounting mechanism protects the driver and passengers from bullets shot into the door 4 or the door window opening 5. When the driver 300 must leave the patrol vehicle 1 and wants personal protection, the transparent panel 20 may be removed from the mounting mechanism 25 and held in front of the driver using the handle 400 as shown in FIG. 2.

In compliance with the statute, the invention described has been described in language more or less specific on structural features. It should be understood, however, that the invention is not limited to the specific features shown, since the means and construction shown comprises the preferred embodiments for putting the invention into effect. The invention is therefore claimed in its forms or modifications within the legitimate and valid scope of the amended claims, appropriately interpreted the doctrine of equivalents.

We claim:

1. A patrol vehicle protection system, comprising:
   a. a mounting mechanism that selectively holds a transparent panel to cover a door window opening on a patrol vehicle, said mounting mechanism includes an upper bracket, a lower bracket, and a brace extending between said upper bracket and said lower bracket, said brace includes an upper end and a lower end, said upper bracket configured to be inserted into an upper window track formed around said door window opening, said lower bracket configured to be inserted into a lower window track around said door window opening;

b. a transparent panel configured to fit inside said door window opening and supported by said upper bracket and said lower bracket when installed in said door window opening, said transparent panel made of ballistic-rated material and has a shape and thickness that prevent a ballistic object from penetrating said door window opening; and, c. connecting elements disposed between said upper bracket and said transparent panel and between said lower bracket and said transparent panel, said connecting elements produce enough force to hold said transparent panel against said mounting mechanism and inside said door window opening when driving said patrol vehicle but enable said transparent panel to release outward from said mounting mechanism when a lateral side impact force is applied to said patrol vehicle.

2. The patrol vehicle protection system, as recited in claim 1, further including an external handle attached to said transparent panel.

3. The patrol vehicle protection system, as recited in claim 1, further including a case configured to carry said transparent panel.

4. The patrol vehicle protection system, as recited in claim 3, wherein said case includes an upper leaf and a lower leaf that selectively opens and closes around said transparent panel, said case includes an internal pocket, and a ballistic fabric panel located inside said internal pocket.

5. The patrol vehicle protection system, as recited in claim 4, wherein said upper leaf includes a door handle opening.

6. The patrol vehicle protection system, as recited in claim 4, further including connectors that selectively attaches to said upper leaf to hang said case below said lower bracket.

7. The patrol vehicle protection system, as recited in claim 1, wherein said brace includes an upper edge and a lower edge and said upper bracket includes a receiving slot that receives said upper edge of said brace, and said lower bracket includes a receiving slot that receives said lower edge of said brace.

8. The patrol vehicle protection system, as recited in claim 1, further includes a lock disposed between said upper bracket and said lower bracket and said upper end and said lower end of said brace to securely connect said brace to said upper bracket and to said lower bracket.

9. The patrol vehicle protection system, as recited in claim 1, wherein said connecting elements are a plurality of magnets located in the inside surface of said transparent panel magnetically attracted to said upper bracket and said lower bracket.

10. The patrol vehicle protection system, as recited in claim 1, wherein said connecting elements are hook and loop connectors located in the inside surface of said transparent panel and said upper bracket and said lower bracket configured to hold said transparent panel on said upper bracket and said lower bracket.

11. The patrol vehicle protection system, as recited in claim 1, wherein said connecting elements are rotating tabs mounted on said upper bracket and said lower bracket configured to hold said transparent panel against said upper bracket and said lower bracket.

12. An improved patrol vehicle protection system that includes a transparent panel made of anti-ballistic material that fits into a door window opening on a patrol vehicle, the improvement comprising;

a. a mounting mechanism on said patrol vehicle that selectively holds said transparent panel over said door window opening, said mounting mechanism includes an upper bracket, a lower bracket, and a brace extending between said upper bracket and said lower bracket, said upper bracket configured to be inserted into an upper window track formed along said window opening, said lower bracket configured to be inserted into a lower window track of said door window opening; and, b. a plurality of connecting elements disposed on said upper bracket and on said lower bracket configured to attached to said transparent panel when placed into said door window opening, said connecting elements produce a sufficient force to hold said transparent panel against said mounting mechanism and inside said door window opening when driving said patrol vehicle but releases said transparent panel outward from said mounting mechanism when a lateral side impact force is applied to said patrol vehicle.

13. The patrol vehicle protection system, as recited in claim 9, further including a case configured to carry said transparent panel.

14. The patrol vehicle protection system, as recited in claim 13, wherein said case includes an upper leaf and a lower leaf that selectively opens and closes around said transparent panel, said case includes an internal pocket and a ballistic fabric panel located inside said internal pocket.

15. The patrol vehicle protection system, as recited in claim 14, wherein said upper leaf includes a door handle opening.

16. The patrol vehicle protection system, as recited in claim 14, further including connectors attached to said lower bracket that selectively attaches to said upper leaf.

17. The patrol vehicle protection system, as recited in claim 9, wherein said brace includes an upper edge and a lower edge and said upper and said lower bracket each include a receiving slot that receives said upper edge and said lower edge of said brace.

18. The patrol vehicle protection system, as recited in claim 9, further includes a lock disposed between said upper and lower brackets and said upper and lower ends of said brace to securely connect said brace to said upper bracket and to said lower bracket.

19. The patrol vehicle protection system, as recited in claim 12, wherein said connecting elements are a plurality of magnets.

20. The patrol vehicle protection system, as recited in claim 12, wherein said connecting elements are hook or loop connectors.

* * * * *